United States Patent [19]

Skoglund

[11] Patent Number: 5,416,134
[45] Date of Patent: May 16, 1995

[54] WATER-BORNE ACRYLIC EMULSION PRESSURE SENSITIVE LATEX ADHESIVE COMPOSITION

[75] Inventor: Michael J. Skoglund, Dublin, Ohio

[73] Assignee: Ashland Oil, Inc., Ashland, Ky.

[21] Appl. No.: 171,196

[22] Filed: Dec. 21, 1993

Related U.S. Application Data

[63] Continuation of Ser. No. 919,033, Jul. 22, 1992, abandoned, which is a continuation-in-part of Ser. No. 703,149, May 17, 1991, abandoned, which is a continuation-in-part of Ser. No. 530,013, May 29, 1990, abandoned.

[51] Int. Cl.$^6$ .............................................. C09J 131/02
[52] U.S. Cl. .................................. 523/201; 524/140; 524/141; 524/145; 524/460; 524/501; 524/521
[58] Field of Search ............... 524/140, 141, 145, 501, 524/521, 460; 523/201

[56] References Cited

U.S. PATENT DOCUMENTS

| | | | |
|---|---|---|---|
| 4,321,175 | 3/1982 | Schmidt et al. | 524/555 |
| 4,529,772 | 7/1985 | Druschke et al. | 524/555 |
| 4,540,739 | 9/1985 | Midgley | 524/764 |
| 4,616,057 | 10/1986 | Lindemann et al. | 524/458 |
| 4,983,656 | 1/1991 | Ito et al. | 524/109 |
| 5,025,062 | 6/1991 | Ley et al. | 524/556 |

*Primary Examiner*—Romulo H. Delmendo
*Attorney, Agent, or Firm*—Mueller and Smith

[57] ABSTRACT

The present invention is directed to an aqueous emulsion acrylic pressure sensitive adhesive composition that excels in high performance applications. The inventive adhesive composition comprises in water:

(I) a polymer system wherein the system is:
 (A) (a) a copolymer of between about 95 wt-% and 99.9 wt-% of a $C_4$–$C_{18}$ alkyl (meth)acrylate monomer and between about 0.1 wt-% and 5 wt-% N-alkyl substituted or unsubstituted amide of (meth)acrylic acid, and
 (b) a homopolymer or copolymer of between about 0 wt-% and 99.8 wt-% of a $C_4$–$C_{18}$ alkyl (meth)acrylate monomer and about 0.2 wt-% and 100 wt-% of an ethylenically unsaturated carboxylic acid; or
(B) (a) a copolymer of between about 90 wt-% and 99.8 wt-% of a $C_4$–$C_{18}$ alkyl (meth)acrylate monomer and about 0.2 wt-% and 10 wt-% of an ethylenically unsaturated carboxylic acid; and
 (b) a homopolymer or copolymer of between about 0 wt-% and 99.1 wt-% of a $C_4$–$C_{18}$ alkyl (meth)acrylate monomer and between about 0.1 wt-% and 100 wt-% N-alkyl substituted or unsubstituted amide of (meth)acrylic acid, or
(C) an interpenetrating polymer network emulsion of:
 (a) a copolymer of a $C_4$–$C_{18}$ alkyl (meth)acrylate monomer and about 0.2 wt-% and 10 wt-% of an ethylenically unsaturated carboxylic acid, and
 (b) a copolymer of a $C_4$–$C_{18}$ alkyl (meth)acrylate monomer and between about 0.1 wt-% and 5 wt-% N-alkyl substituted or unsubstituted amide of (meth)acrylic acid, wherein at least one of (A)(a) or (A)(b) is an aqueous emulsion copolymer made by emulsion polymerization and at least one of (B)(a) or (B)(b) is an aqueous emulsion copolymer made by emulsion polymerization; and
(II) a surfactant. Advantageously, the emulsion copolymer(s) includes up to 25% by weight of styrene or other aromatic monomer(s).

17 Claims, No Drawings

WATER-BORNE ACRYLIC EMULSION PRESSURE SENSITIVE LATEX ADHESIVE COMPOSITION

CROSS-REFERENCE TO RELATED APPLICATIONS

This application is a continuation of application U.S. Ser. No. 07/919,033, filed Jul. 22, 1992, now abandoned, which is a continuation-in-part of U.S. Ser. No. 07/703,149, filed May 17, 1991, now abandoned, which is a continuation-in-part of application U.S. Ser. No. 07/530,013, filed May 29, 1990, now abandoned, the disclosures of which are expressly incorporated herein by reference.

BACKGROUND OF THE INVENTION

The present invention relates to pressure sensitive adhesives and more particularly to a water-based pressure sensitive adhesive suitable for high performance applications.

The manufacture of pressure sensitive adhesive tapes is being shifted from organic solvent systems to aqueous latices in order to reduce air pollution and fire hazard, as well as eliminate the rising expense of organic solvents. Pressure sensitive adhesives for high performance application must meet or exceed diverse, often seemingly incompatible, criteria. Initially, the adhesive must coat well on silicone or other release sheets. The adhesive also must exhibit tenacious adherence to film face stock which may serve a masking function or may convey information, e.g. by its imprinting.

When the adhesive coated film face stock is removed from the release sheet, the adhesive must exhibit initial tack and peel performance when pressure-applied to a substrate. The substrate beating the adhesively-bound film face stock may be subjected to a variety of manufacturing operations over time. Thermal cycling of the substrate is a condition to which high performance, pressure sensitive adhesives must be designed to confront. When the film face stock is removed from the substrate, removal must be clean, i.e. no visible trace of the adhesive should remain on the substrate. Heat aging of the film face stock/substrate laminate, however, tends to cause the adhesive to "build", that is, the necessity to utilize excessive force to remove the film face stock. Thus, the adhesive should stick well initially, but not so well that its later removal is difficult. Then too, the adhesive must possess shelf life, viscosity, etc. making it compatible with existing coating and handling techniques utilized in the art.

Prior proposals aimed at making pressure sensitive adhesives tapes include, for example, U.S. Pat. No. 3,657,396 which proposes a mixture of polyvinylmethyl ether and an acrylic acid polymer which mixture is dispersed in water. The acrylic polymer is selected from the group consisting of polyacrylic acid, polyacrylamide, N-methylol polyacrylamide and an acrylic copolymer of a monomer selected from the group consisting of acrylic acid, acrylamide, and N-methylol acrylamide in a monomer selected from the group consisting of lower alkyl esters of acrylic acid and methacrylic acid. European patent application publication No. 287306 proposes removable pressure-sensitive adhesive tapes comprising copolymers of terminally-unsaturated vinyl monomers and vinyl-unsaturated homopolymerizable emulsifier monomers, combined with a phosphate emulsifier. Japanese Kokai patent No. Sho 47 [1972]-110263 proposes a transfer-resistant aqueous pressure sensitive adhesive comprising a resin emulsion derived from an acrylic monomer and 1-4 weight pans of an ethylenically-unsaturated acrylamide monomer. Australian application No. 24491/84 proposes pressure sensitive adhesives comprising an acrylic copolymer synthesized from 2-ethylhexyl acrylate and n-butyl acrylate, acrylonitrile, acrylic acid, N-methylol acrylamide, and optionally vinyl sulfonic acid; and plasticizer.

U.S. Pat. No. 4,540,739 proposes a pressure sensitive adhesive (PSA) having improved shear properties and comprising a latex of a polymer having a $T_g$ which is less than about 0° C. and formed by emulsion polymerizing a monomeric mixture of 60–99.5 wt-% of a $C_1$-$C_8$ alkyl or alkanol ester of (meth)acrylic acid and from about 0.5 to about 40 wt-% of a $C_3$-$C_9$ ethylenically unsaturated acid. Optionally, the monomeric mixture can include up to 5 wt-% of an amide of a $C_3$-$C_9$ ethylenically unsaturated acid which amide may be unsubstituted or substituted at the nitrogen atom by a $C_1$-$C_8$ alkyl or alkanol radical. The PSA has its pH adjusted to be equal to or greater than about 6 with an agent selected from hydroxides and salts of lithium, sodium, potassium, and mixtures thereof.

BROAD STATEMENT OF THE INVENTION

The present invention is directed to an aqueous emulsion acrylic pressure sensitive adhesive composition that excels in high performance application. The inventive adhesive composition comprises in water:

(I) a polymer system wherein the system is:
(A)
  (a) a copolymer of between about 95 wt-% and 99.9 wt-% of a $C_4$-$C_{18}$ alkyl (meth)acrylate monomer and between about 0.1 wt-% and 5 wt-% N-alkyl substituted or unsubstituted amide of (meth)acrylic acid, and
  (b) a homopolymer or copolymer of between about 0 wt-% and 99.8 wt-% of a $C_4$-$C_{18}$ alkyl (meth)acrylate monomer and about 0.2 wt-% and 100 wt-% of an ethylenically unsaturated carboxylic acid; or (B)
  (a) a copolymer of between about 90 wt-% and 99.8 wt-% of a $C_4$-$C_{18}$ alkyl (meth)acrylate monomer and about 0.2 wt-% and 10 wt-% of an ethylenically unsaturated carboxylic acid; and
  (b) a homopolymer or copolymer of between about 0 wt-% and 99.1 wt-% of a $C_4$-$C_{18}$ alkyl (meth)acrylate monomer and between about 0.1 wt-% and 100 wt-% N-alkyl substituted or unsubstituted amide of (meth)acrylic acid, or (C) an interpenetrating polymer network emulsion of:
  (a) a copolymer of a $C_4$-$C_{18}$ alkyl (meth)acrylate monomer and about 0.2 wt-% and 10 wt-% of an ethylenically unsaturated carboxylic acid, and
  (b) a copolymer of a $C_4$-$C_{18}$ alkyl (meth)acrylate monomer and between about 0.1 wt-% and 5 wt-% N-alkyl substituted or unsubstituted amide of (meth)acrylic acid, wherein at least one of (A)(a) or (A)(b) is an aqueous emulsion copolymer made by emulsion polymerization and at least one of (B)(a) or (B)(b) is an aqueous emulsion copolymer made by emulsion polymerization; and (II) a surfactant. Advantageously, the emulsion copolymer(s) includes up to 25% by weight of styrene or other aromatic monomer(s).

In high performance applications, the novel adhesive composition is substantially-free of cross-linking monomers, copolymerizable emulsifiers, N-methylol acrylamides and the like, cross-linking additives (i.e. post-polymerization addition yielding a cross-linking reaction or formation of interpolymer bonds, such as, for example, zinc salts, diisocyanates, diglycidyl compounds, etc.), and zwitterionic monomers (i.e. not more than about 15 wt-% of cross-linking ingredient, including monomers and additives). Basification of the ethylenically-unsaturated carboxylic acid copolymer(s) results in a self-thickening adhesive composition and contributes to manufacturing reproducibility of the adhesive composition.

Advantages of the present invention include a manufacturing process that enables the reproducible production of the novel adhesive composition. Another advantage is the ability to synthesize an adhesive composition base that is compatible and blendable with other conventional ingredients at all levels. A further advantage is the ability to produce an ultra-removable adhesive composition. A yet further advantage is the ability to formulate adhesive compositions of varying desired performance levels by blending of the acrylic acid copolymer and the acrylamide copolymer at different ratios. These and other advantages will be readily apparent based upon the disclosure set forth herein.

DETAILED DESCRIPTION OF THE INVENTION

The major ingredient in the emulsion copolymer(s) broadly is a $C_4$-$C_{18}$ alkyl (meth)acrylate monomer and advantageously a $C_4$-$C_{12}$ alkyl (meth)acrylate monomer. n-Butyl acrylate and 2-ethylhexyl acrylate are two monomers that have proven advantageous in forming the emulsion copolymer(s) of the present invention, though other straight chain, alicyclic, and cyclic alkyl (meth)acrylate monomers may be used as is necessary, desirable, or convenient. By convention, the parentheticals used herein designate optional content, i.e. (meth)acrylate means "acrylate" or "methacrylate", and the same is true for the parenthetical plurals used herein. Also by convention, copolymer and interpolymer both mean a polymer of two or more monomers. The selection of the terms as used herein is for the clarity of understanding and not by way of limitation.

A combination of acrylamide and ethylenically unsaturated carboxylic acid form the balance of the emulsion copolymer(s) and their combination is important to the high performance properties realized. The proportion of acrylamide ranges from about 0.1 wt-% to about 5 wt-% while the proportion of unsaturated acid ranges from about 0.2 to about 10% by weight. For present purposes, the acrylamide content includes N-alkyl and other substituted acrylamides and polyamides, e.g. diamides. Cross-linking monomers, e.g. N-methylol acrylamides, may be present in minor amount (e.g. not more than about 15 wt-%), though such latent cross-linking functionality tends to lower tack and initial peel values, thus reducing the strength and suitability of the adhesive composition for some applications. N-methylol substituted acrylamides may be present in the formulation, but such components generate formaldehyde when the films are coated which is a health concern in the industry. Latent cross-linking functionality additionally can cause a loss of adhesive properties of aged unapplied films and labels. Additive cross-linkers cause problems in use with adhesive batch-to-batch consistency, pot life, reactivity, and variation in adhesive performance. Fortuitously, latent cross-linking functionality and additive cross-linkers are not required of the novel adhesive composition.

While the preferred acid simply is acrylic acid, a variety of additional ethylenically unsaturated carboxylic acids may be useful in forming the emulsion copolymer. Additional acids include, for example, butenic acids, e.g. crotonic acid, isocrotonic acid, and vinyl acetic acid; an acid from the fumaric acid series, e.g. fumaric acid, maleic acid, glutaconic acid, allyl malonic acid, and allyl succinic acid; and dicarboxylic acids, e.g. itaconic acid. Lower alkyl-substituted (e.g. $C_1$-$C_4$ alkyl group) acrylic acid, e.g. methacrylic acid, additionally can find use in formulating the emulsion copolymer(s) of the present invention. With respect to the ratio of acrylamide to acrylic acid, such ratio broadly ranges from about 1:10 to about 10:1 by weight with about 1:2 being optimum for acrylamide to acrylic acid. This ratio is believed to be important in providing removability characteristics with retention of good initial tack and peel values.

Optionally, one or both of the emulsion copolymers or the IPN can contain styrene or other aromatic polymerizable monomer, vinyl chloride, vinylidene chloride, or other hydrophobic monomer ethylene vinyl acetate. Styrene can be present in an amount up to about 25% by weight of both copolymers or IPN and preferably about 5% by weight styrene is included in the monomer mixture(s) that is subjected to emulsion copolymerization in accordance with the precepts of the present invention.

If a blend of copolymers with separate acrylamide and unsaturated acid is used in formulating the novel adhesive composition, then at least one of the copolymers is made by emulsion polymerization techniques, while the other copolymer can be made by emulsion polymerization, solution polymerization, bulk polymerization, suspension polymerization, or other technique [see generally, D. H. Solomon, *The Chemistry of Organic Film Formers*, Robert E. Krieger Publishing Company, Huntington, N. Y. (1977)]. If an IPN is used in formulating the novel adhesive composition, the interpenetrating polymer network can be based either on the acrylamide-containing copolymer or on the unsaturated acid-containing copolymer, though synthesis again is by emulsion polymerization. Details on synthesis of interpenetrating polymer network emulsions can be found in U.S. Pat. No. 4,616,057, the disclosure of which is expressly incorporated herein by reference.

The emulsion copolymers or IPN can be made by a batch, semi-batch, or continuous process, though preferably a semi-batch process is employed. Despite the ability to meter a constant mixture of the monomers to the reaction vessel, the product emulsion copolymer blend evidences a two-stage morphology, as will be explored further below. Emulsion polymerization in the aqueous continuous phase is conducted in conventional fashion, such as described by D. H. Solomon in *The Chemistry of Organic Film Formers*, pp 294–303, supra. To this end, a conventional emulsifier, e.g. sodium alkylaryl polyethoxy sulfonate or the like, is utilized during the emulsion polymerization reaction. Conventional emulsion polymerization conditions are utilized, though higher non-volatile solids product content may optimize performance, e.g. about 50–65% non-volatile solids of the product emulsion copolymers. The reaction is continued until desirably virtually no acrylamide or other unreacted monomer remains. Any residual unreacted monomer should be removed at the end of the reaction in order that its presence does not degrade performance of the novel adhesive composition. Conventional free radical initiators are used, e.g. hydrogen peroxide, sodium persulfate, potassium persulfate, ammonium persulfate, and like peroxide and persulfate initiators. Conventional reducing agents (e.g. sodium metabisulfate or sodium formaldehyde sulfoxylate) are used as part of the redox initiator systems.

The copolymerization with acrylic acid preferably is run without a buffer at a pH of about 2–3 as determined by the decomposition of the persulfate catalyst (i.e. sulfonic acid generation). Since the pKa of acrylic acid is about 4, the pH of this emulsion reaction mixture should be very low, e.g. much less than 4, so that the acrylic acid copolymer does not ionize and thicken during the reaction. Once the reaction is complete, this copolymer can be basified (i.e. the pH raised with base above pH of reaction) to a pH of above 3, broadly 3–10, and preferably about 8–9. Basification provides a self-thickening adhesive composition and has been determined to enable manufacturing reproducibility of the adhesive composition. For efficiency and economy, aqueous ammonia can be used to basify the composition, though other bases, e.g. various amines, imines, alkali metal and alkaline earth metal hydroxides, carbonates, etc., can be used as is necessary, desirable, or convenient.

In making the emulsion copolymers or IPN, it is a distinct advantage that the emulsion copolymers or IPN need not contain any cross-linking monomers, N-methylol acrylamides, or zwitterionic monomers. These ingredients generally lower tack and initial peel values, thus reducing the strength and suitability of the adhesive contact, especially in high performance applications. Latent cross-linking functionality, additionally, can cause a loss of adhesive properties for aged unapplied films and labels and yellowing or discoloration of the adhesive. Thus, while such ingredients can be included in the emulsion copolymers or IPN in minor amount (e.g. not more than about 15 wt-%), they are not necessary and desirably are avoided.

As the example will demonstrate, superior adhesive performance results when a blend of an acrylic acid copolymer and an acrylamide copolymer form the adhesive composition compared to a single copolymer which contains both acrylic acid and acrylamide functionality. The same adhesive performance improvement also is seen when an IPN forms the adhesive composition. Fortuitously, the use of a blend of copolymers enables the formulator to offer a wide variety of products having a wide range of performance (e.g. peel values) by simply varying the amount of each copolymer blended to make the adhesive composition product. Each copolymer can be made and stored for blending at a later date. Such flexibility is not afforded the formulator when a single interpolymer contains both the acrylic acid and the acrylamide monomers since new interpolymers must be made each time different performance criteria is required.

The next ingredient utilized in formulating the novel adhesive composition is a surfactant (preferably a phosphate ester surfactant) that should be present in a proportion of about 0.01% to 10% by dry weight of the emulsion copolymers or IPN. The phosphate ester surfactant serves a dual function in the adhesive composition. One function is to promote the removability of a label or other substrate coated with a cured residue of the adhesive composition. The second function is the ability of the phosphate surfactant to wet-out silicone release sheets which enhances coatability of the aqueous emulsion polymer on such release sheets. Too much phosphate, however, tends to promote foaming of the adhesive composition which detracts from its use in commercial settings. A good discussion of phosphate emulsifiers can be found in European patent application publication No. 287,306, cited above. Examples of these emulsifiers include, for example, ammonium, potassium or sodium salts of alkyl aryl polyethoxy phosphates, alkyl ethoxy phosphates, alkyl phosphates, alkyl polyethoxy phosphates, and the like, and even mixtures thereof. The phosphate coester structure augments the removability and other performance characteristics.

The following conceptualizations are proposed to provide a theoretical framework explaining the phosphate coester modified carboxy/amide containing acrylic emulsion polymer blend or IPN which is the basis for the adhesives disclosed herein. While the various polymer-surfactant interactions are supported by known hydrogen bonding in phospholipid chemistry (see Ceve, et al. *Phospholipid Bilayers-Physical Principles and Models*, Wiley-Interscience, John Wiley and Sons), the theory presented below is not a limitation of the present invention.

Carboxyl and amide-containing acrylate polymers may be expected to contain interpolymer hydrogen bond interactions including $COOH/CONH_2$, $COOH/COOH$, and $CONH_2/CONH_2$. These interpolymer associations are believed to contribute to the removable adhesive properties of the novel adhesive composition. This relationship between polymer structure and performance also is supported by the observation that completion of the reactions at lower non-volatile (nv) solids in combination with consuming unreacting monomers results in a different performance profile for the copolymer blend or IPN. Heat aged performance of different nv solids emulsion copolymer blend-based adhesive compositions suggest polymer structures that develop during the polymerization and that this improves adhesive removability. It is believed that polymer hydrophilic morphology develops during the latter states of reaction to create an amide rich latex shell.

Typical phosphate coester surfactants contain hydrophobic groups and a —POOH moiety. Commercial synthetic phosphate surfactants are functionally similar to phospholipids and are capable of hydrophobic, hydrogen bonding, and electrostatic interactions. The strong effects observed for blending small amounts of phosphate surfactants on emulsion viscosity's and polymer film adhesion performance indicates a strong association between phosphate surfactant and latex particles. The structures of the carboxylate and amide copolymers or the structure of the IPN in combination with the phosphate surfactant also should influence the character of adhesive substrate interfaces. Further, no significant surfactant "bleed" or migration in the phosphate surfactant emulsion has been observed, indicating that the surfactant is absorbed effectively in the colloid polymer film. This is a distinct advantage of the inventive adhesive composition. Prior removable adhesives (i.e., with plasticizers) often bleed through paper face stocks causing disfiguration of the paper label. The inventive adhesive does not "bleed" on paper face stock. This is evidence for attractive interaction and negative free energy of mixing.

Phosphate hydrogen bonding or electrostatic interaction is possible with carboxyl and amide polymer groups. Phosphate-polymer associations could form a colloid interpolymer network.

A postulated colloid polymer structure involves an acrylate polymer core surrounded by a carboxyl/amide rich polymer shell. The surface of the latex is composed of the phosphate ester surfactant and the emulsion copolymer emulsifier. The anionic groups of the surfactant and emulsifier support an electrical charged layer around the particle providing colloid stability. Ionization of polymer bound carboxylic acid at, e.g., pH 3-6, expands the outer layers of the latex particle, resulting in increased latex viscosity. Film formation is affected by the outer layer of structure of the colloid IPN polymer or polymer blend during particle coalescence. The structural changes affect film adhesive properties. Polymer film structure is affected by phosphate coester hydrophobe structure and the extent of ionization of the carboxylic functionality. These interfacial phenomena result in specific structural networks in the coalesced latex adhesive film. This film structure, in turn, yields special performance properties (i.e. low peel build on aging) having pronounced effects on peel and shear values. Other surfactants (e.g. polyoxyethylene-polyoxypropylene block copolymers, alkanol amides, amine oxides, amines, ethoxylated amines, imidazolines, etc.) may be used instead of the preferred phosphate coester surfactants.

With respect to performance of the adhesive composition, advantageously, the adhesive is removable from a variety of substrates cleanly, i.e. no visible residue, including, for example, metals (e.g., stainless steel, aluminum, etc.) and plastics (e.g., polyethylene, polypropylene, polystyrene, polycarbonate, ABS resin, PVC resin, etc.) Build on aging generally is less than 100% when the applied adhesive is maintained at 70° C. for three weeks and less than 50% when aged at room temperature for three weeks. A viscosity of about 1,000–10,000 centipoises is compatible with existing equipment and handling procedures, and preferably a viscosity of about 2,000–4,000 centipoises is maintained. Consistent with the theory expounded above is that testing has revealed that high surface energy polymeric film face stocks provide outstanding performance to the adhesive composition. Surface energy is the product obtained by multiplying surface tension by the two-thirds of the molecular weight and specific volume (e.g. see U.S. Pat. No. 4,529,563). Such face stocks include, for example, plasticized polyvinyl chloride and polyester films. Other film face stocks also are useful including, for example, cellulosics, metal foil, composites, and the like. In this regard, an emulsion copolymer based on 2-ethylhexyl acrylate has been determined to retain improved aged adhesive performance on plasticized vinyl facestock.

Conventional additives may be incorporated into the adhesive composition, including, for example, wetting agents, pigments, opacifying agents, anti-foam agents, and the like and mixtures thereof. The adhesives may be applied to one or both sides of the film face stock in a conventional manner, for example, by spraying, knife coating, roller coating, casting, drum coating, dipping, and the like. Indirect application using a transfer process with silicon release paper also can be used. After the adhesive has been applied, the coated film face stock is dried conventionally.

The following examples show how the present invention has been practiced, but should not be construed as limiting. In this application, all percentages and proportions are by weight and all units are in the metric system, unless otherwise expressly indicated. Also, all citations referred to herein are expressly incorporated herein by reference.

IN THE EXAMPLE

The emulsion polymerization procedure used to make the acrylic emulsion copolymers will be illustrated by the following detailed procedure. Material variances from this typical synthesis and the specific monomer mixtures will be detailed in the working example.

TABLE 1

| Comparison Emulsion Copolymer 4886-155 | |
|---|---|
| Ingredient | Amount (wt-parts) |
| Monomer Emulsion | |
| Butyl acrylate | 740.0 |
| Styrene | 36.0 |
| Acrylic acid | 16.0 |
| Acrylamide | 8.0 |
| Triton X-200* | 72.0 |
| DI Water** | 196.3 |
| Catalyst #1 | |
| Sodium Bisulfite | 0.8 |
| DI Water | 8.0 |
| Catalyst #2 | |
| Potassium Persulfate | 2.4 |
| DI Water | 46.4 |
| Catalyst #3 | |
| t-Butyl Hydroperoxide | 0.4 |
| DI Water | 10.0 |
| Catalyst #4 | |
| Sodium Formaldehyde Sulfoxylate | 0.2 |
| DI Water | 4.0 |

*Triton X-200 emulsifier is sodium alkyl aryl polyethoxy sulfonate, 28 wt-% actives, Union Carbide Corporation, Danbury, CT.
**DI Water is deionized water.

Emulsion polymerizations were conducted in a 3-liter Pyrex brand glass reactor equipped with water bath, mechanical stirrer, $N_2$ atmosphere, condenser, thermocouple, and pumps for monomer and initiator feeds. A monomer emulsion was prepared with 800 g total monomer (the amount used in all preparations), deionized water (196.3 g), and Triton X-200 emulsifier. The reactor was charged with deionized water (230 g) and the initial monomer emulsion (21.3 g, 2.0%) and warmed to 76° C. initiation temperature with stirring. Catalyst #1 and 2 wt-% of catalyst #2 were used to initiate the reaction. After the initiation reaction, the remaining monomer emulsion and potassium persulfate solution were delayed fed at a constant rate over a 3 hour time period while maintaining a reaction temperature of 80° C. The reaction temperature was maintained for an additional 30 minutes after the feed ended.

The reaction temperature then was lowered to 50° C. and chaser catalysts, tert-butyl hydroperoxide (70%) aqueous solution (0.4 g in 10 ml) and sodium formaldehyde sulfoxylate aqueous solution (0.4 g in 10 ml), were added to reduce residual monomer content. The reaction temperature of 50° C. was maintained for 30 minutes and then lowered to 35° C., and a biostat (Kathon LX, 1.5%, 2 g) was added. Emulsion copolymer 4886-155 had a solids content of 61%, a pH of 2.6, and viscosity of 3,040 cps (Brookfield RV spindle #4 at 20 rpm).

The following test procedures were used in the example:

1. 180° Peel Test: PSTC-1 (November 1975), Pressure Sensitive Tape Council, Glenview, Ill. Results of this test are reported in pounds/inch.
2. 178° Shear Test: PSTC-7 (November 1975). Pressure Sensitive Tape Council. Results of this test are reported in hours/1000 gm/0.5 in$^2$ at 23° C.
3. Polyken Tack Test: This test is conducted on a Polyken, Jr. Probe Tack Tester (Polyken is a trademark of the Kendall Company) supplied by Testing Machines, Inc. (Amityville, N.Y.) under the following conditions:

Probe: 304 SS. 0.5 cm. diameter probe polished to 4/0 emery paper finish.
Dwell Time: 1 second
Probe Contact Pressure: 100 gm/cm2
Prove Retraction Rate: 1 cm/sec.
Annular Weight: 20 gm.–100 gm/cm2 pressure of a 0.5 cm. diameter probe
Procedure: A one-inch square of MYLAR polyester film coated with the adhesive is placed on top of the annular weight so that the hole is completely covered by the adhesive area and this assembly placed in the weight carrier well. The machine is activated and the sequence of probe pressure and probe retraction automatically accomplished. The force required to free the probe from adhesive coated film, measured in grams/cm2 is read from the indicator dial on the machine.

EXAMPLE

Several different macromolecular arrangements of carboxylic and amide functional polymers were investigated as follows:

1. Simple emulsion copolymerization of carboxyl and amide-bearing monomers with acrylate ester (4886-155).
2. Emulsion polymer physical blend of a carboxylated acrylic latex and an amide functional acrylic latex.
3. A combination of a functional aqueous colloidal polymer and functional water soluble polymer.
   (a) Carboxylated acrylic emulsion copolymer modified with polyacrylamide solution polymer.
   (b) Acrylamide-containing acrylic emulsion copolymer modified with polyacrylic acid solution polymer.
4. Interpenetrating emulsion polymer networks (IPNs) containing carboxylic and amide functionalities.
   (a) Polymerization of an interpenetrating acrylamide copolymer with an acrylic acid copolymer.
   (b) Polymerization of an interpenetrating acrylic acid copolymer with an acrylamide copolymer.

These structural polymer variations were prepared to yield equivalent aggregate compositions. The synthesis thereof is summarized in Table 2 below.

TABLE 2

| Laboratory Reference | Polymer[b] Type | Emulsion Polymerization[a] Summary | | | | |
|---|---|---|---|---|---|---|
| | | Polymer[b] Composition AMD/AA/STY/BA | Final[c] Solids (wt-%) | Final[d] Viscosity (cps) | Final pH | Particle[e] Size (nm) |
| 5042-154 | 1 × AA<br>1 × AMD<br>Single Stage | 1.0/2.0/4.5/92.5 | 58.9 | 1600 | 2.3 | 240 |
| 5042-29 | 1 × AA<br>Single Stage | 0.0/2.0/4.5/93.5 | 59.8 | 690 | 2.2 | 250 |
| 5042-89 | 1 × AMD<br>Single Stage | 1.0/0.0/4.5/94.5 | 58.9 | 1650 | 2.3 | 250 |
| 5121-8 | 2 × AA<br>Single Stage | 0.0/4.0/4.5/91.5 | 57.9 | 700 | 2.6 | 240 |
| 5121-10 | 2 × AMD<br>Single Stage | 2.0/0.0/4.5/93.5 | 55.9 | 2850 | 2.7 | 270 |
| 4864-82 | Two Stage IPN[f] | 1) 0.0/4.0/4.5/91.5<br>2) 2.0/0.0/4.5/93.5 | 58.0 | 490 | 2.1 | 290[g] |
| 4864-84 | Two Stage IPN[f] | 1) 2.0/0.0/4.5/93.5<br>2) 0.0/4.0/4.5/91.5 | 54.7 | 670 | 2.0 | 310[g] |

Footnotes to Table 2
[a] All single stage emulsion polymerizations were conducted in deionized water with pre-emulsified monomer in deionized water containing 9% Triton X-200 surfactant. Polymerizations were initiated with 21.4 grams of monomer emulsion in 230 grams deionized water with a sodium bisulfite potassium persulfate initiator system. Reactions were carried out at 80° C. with delayed monomer emulsion and potassium persulfate solution additions over a three hour period.
[b] AMD = Acrylamide, AA = Acrylic Acid, STY - Styrene, BA = n-Butyl Acrylate Polymer composition in monomer weight percent
[c] Non-volatile weight percent
[d] Brookfield RVF viscosity at 20 rpm, 25° C.
[e] Unimodal distribution means obtained on a Coulter Model N4 particle size analyzer.
[f] Interpenetrating emulsion polymers were prepared using equal weights of seed emulsion (5121-8 & 5121-10) dry polymer and interpenetrating second stage monomers. Initial IPN reaction conditions were adjusted to represent the continuous feed reaction (5042-154) at 50% delayed monomer feed reacted The monomer emulsion was added to the first stage emulsion polymer, mixed for 30 minutes, and reacted in two portions. The resulting overall monomer and surfactant compositions for the acrylamide IPN (4864-82), acrylic acid IPN (4864-84), and continuous polymerization (5042-154) are identical. Experimental details can be found in laboratory notebook 4864.
[g] The 40 and 50 nm increase in mean particle size for interpenetrating polymers 4864-82 and 4864-84 over the seed latices 5121-8 and 5121-10 is evidence of interpenetrating polymer formation. Particle volume increases are about 70% of theoretical.

The emulsions were all compounded with phosphate coester surfactant and basified with aqueous ammonia to afford pressure sensitive adhesives. This compounding is summarized in Table 3 below.

TABLE 3

| | Compounding Summary | | | | | |
|---|---|---|---|---|---|---|
| Laboratory Reference | Carboxyl Polymer Source (gram) | Amide Polymer Source (gram) | Deionized Water (gram) | Strodex[g] SEK-50 (gram) | Colloids 679 (gram) | Aqua[h] Ammonia (gram) |
| 5042-184A | | Acrylic Acid-Acrylamide | 20.0 | 3.5 | 0.3 | 1.5 |

TABLE 3-continued

Compounding Summary

| Laboratory Reference | Carboxyl Polymer Source (gram) | Amide Polymer Source (gram) | Deionized Water (gram) | Strodex[g] SEK-50 (gram) | Colloids 679 (gram) | Aqua[h] Ammonia (gram) |
|---|---|---|---|---|---|---|
| | | Containing Acrylic Emulsion Copolymer 5042-154 150.0 | | | | |
| 5042-184C | Acrylic Acid Containing Acrylic Emulsion Polymer 5042-29 150.0 | None | 0.0 | 3.6 | 0.3 | 1.5 |
| 5121-17 | Acrylic Acid Containing Acrylic Emulsion Polymer 5042-29 150.0 | Polyacrylamide 5% Aqueous Solution 18.0 | 0.0 | 3.6 | 0.3 | 1.5 |
| 5042-184D | None | Acrylamide Containing Acrylic Emulsion Polymer 5042-89 150.0 | 0.0 | 3.6 | 0.3 | 1.5 |
| 5121-16 | Polyacrylic Acid 5% Ammoniated Aqueous Solution 36.0 | Acrylamide Containing Acrylic Emulsion Polymer 5042-89 150.0 | 0.0 | 3.5 | 0.3 | 1.5 |
| 5121-18A | Acrylic Acid (2×) Containing Acrylic Emulsion Polymer 5121-8 150.0 | None | 10.0 | 3.6 | 0.3 | 1.0 |
| 5121-18B | None | Acrylamide (2×) Containing Acrylic Emulsion Polymer 5121-10 150.0 | 0.0 | 3.6 | 0.3 | 1.0 |
| 5121-18C | Acrylic Acid (2×) Containing Acrylic Emulsion Polymer 5121-8 75.0 | Acrylamide (2×) Containing Acrylic Emulsion Polymer 5121-10 75.0 | 0.0 | 3.6 | 0.3 | 1.0 |
| 5121-48A | Seed Polymer Acrylic Acid Containing Emulsion Polymer 5121-8 (converted) | Interpenetrating Acrylamide Containing Acrylic Emulsion Polymer 4864-82 100.0 | 12.0 | 2.0 | 0.2 | 2.0 |
| 5121-48B | Interpenetrating Acrylic Acid Containing Acrylic Emulsion Polymer 4864-84 100.0 | Seed Polymer Acrylamide Containing Acrylate Emulsion Polymer 5121-10 (converted) | 6.0 | 2.0 | 0.2 | 2.0 |

[a] 2.0 wt-% dry phosphate surfactant on dry emulsion polymer level.
[b] All emulsions were basified with 14% aqua ammonia until an increase in viscosity was obtained.

Adhesive performance results recorded are set forth in Table 4.

TABLE 4

Adhesion Performance Summary[a]
Initial Film and (Aged Film) Properties[b]

| Laboratory Reference | Polymer Architecture | 180° Peel (lbs/in) Dwell Time | | | | Loop Tack (lbs/in) | Polyken Tack (gram) | Shear 1" × 1" × 1 kg (hrs) |
|---|---|---|---|---|---|---|---|---|
| | | 30 min. | 24 Hr. | Week | Week 70° C. | | | |
| 5042-184A | AA/AMD Emulsion Copolymer | 5.6 (3.1) | 7.4 (12.2) | 11.4 | 27.3 | 0.9 (0.6) | 200 (300) | 10.4 C (21.1 C) |
| 5121-18A | AA ×2 Emulsion Polymer | 8.3 (8.0) | 9.6 (15.4) | 26.5 | 35.0 | 1.2 (0.5) | 150 (260) | 34.5 D (14.0 C) |
| 5121-18B | AMD ×2 Emulsion Polymer | 1.6 (1.4) | 2.0 (2.1) | 12.4 | 20.0 | 0.8 (0.6) | 210 (240) | 1.1 A (0.8 A) |
| 5121-18C | AA ×2 Emulsion AMD ×2 Emulsion 1:1 Polymer Blend | 4.5 (5.5) | 7.4 (8.2) | 14.0 | 21.0 | 0.8 (1.0) | 170 (310) | 15.4 (22.1 C) |
| 5042-184C | AA Emulsion Polymer | 13.4 (13.4) | 12.2 (17.6) | 18.9 | 33.4 | 1.2 (0.9) | 220 (370) | 3.1 C (2.5 C) |
| 5121-17 | AA Emulsion Polymer AMD Aqueous Polymer Blend | 13.0 (0.7) | 11.6 (1.2) | 21.4 | 29.6 | 0.7 (1.1) | 155 (310) | 3.8 C (1.3) |
| 5042-184D | AMD Emulsion Polymer | 2.6 (1.5) | 1.0 (1.4) | 3.1 | 25.0 | 1.0 (1.3) | 250 (310) | 2.3 C (2.3 C) |
| 5121-16 | AMD Emulsion Polymer AA Aqueous Polymer Blend | 6.2 (2.9) | 4.6 (3.7) | 16.0 | 22.2 | 0.9 (0.7) | 90 (280) | 0.8 C (1.6 C) |
| 5121-48A | AMD IPN Emulsion Polymer | 9.4 (3.0) | 15.1 (6.4) | 16.1 | 24.8 | 1.0 (0.7) | 310 (250) | 10.7 D (24.6 PD) |

TABLE 4-continued

Adhesion Performance Summary[a]
Initial Film and (Aged Film) Properties[b]

| Laboratory Reference | Polymer Architecture | 180° Peel (lbs/in) Dwell Time | | | | Loop Tack (lbs/in) | Polyken Tack (gram) | Shear 1" × ½" × 1 kg (hrs) |
| --- | --- | --- | --- | --- | --- | --- | --- | --- |
| | | 30 min. | 24 Hr. | Week | Week 70° C. | | | |
| 5121-48B | AA IPN Emulsion Polymer | 14.2 (3.8) | 18.5 (10.9) | 19.2 | 21.8 | 1.1 (1.1) | 270 (210) | 8.6 D (11.4 PD) |

Footnotes to Table 4
[a]Adhesive evaluations were conducted with 1.0 ± 0.1 mil dry adhesive films transfer coated from H.P. Smith 8024 release liner to 2 mil polyester film. All testing was conducted off stainless steel.
[b]Peel tests were conducted under PSTC-1 conditions. Heat aging was conducted at 70° C. (158° F.) in forced air ovens for one week. Data for films heat aged on liner prior to adhesive testing is in parenthesis. All heat aged films and laminates were re-equilibrated to 70° F. 50% relative humidity for one day prior to testing.

Polymer architecture 1 is a comparative formulation. Adhesives prepared from this polymer system with copolymerization of 1 wt-% acrylamide and 2 wt-% acrylic acid typically exhibit 0.5 to 1.0 lbs/in of initial peel, building to about 1.5 lbs/in of peel after aging at 70° C. Loop tacks are about 1.0 lbs/in. This is the performance reference for the other polymers.

Emulsion Blends of Carboxyl and Amide-Containing Latices

The foregoing data in Table 4 summarizes the adhesive performance characteristics for 5121-18C, an adhesive prepared with an equal weight blend of carboxylated acrylate and amide-containing acrylate emulsions. Performance properties were found to be very similar to the acrylic acid-acrylamide copolymer system 5042-184A and intermediate between the adhesive properties of the separate component emulsions, viz, 5121-18A and 5121-18B.

The emulsion polymer blend adhesive exhibited the higher initial peel values of the carboxylated latex and the lower heat-aged peel build of the acrylamide latex. These results indicate higher performing water-borne acrylic emulsion pressure sensitive adhesives can be prepared with latex blends. Also, latex blend ratios may provide specific control over removable adhesive performance. This latter feature would permit greater formulation latitude in developing specialty adhesives.

Emulsion and Aqueous Solution Polymer Blends

A carboxylated acrylate emulsion copolymer was compounded with a polyacrylamide solution polymer to afford adhesive 5121-17. This adhesive displayed similar initial peel values, but lower peel values after heat aging on liner compared to the carboxylated acrylate emulsion adhesive 5042-184C.

An acrylamide acrylate emulsion copolymer was compounded with a polyacrylic acid ammonium salt solution to provide adhesive 5121-16. This adhesive displayed high initial peel values and similar applied heat aged peel values compared to the acrylamide acrylate emulsion copolymer adhesive 5042-184D. In this set of data, the use of the polyacrylic acid solution polymer was found to enhance the peel performance profile of an acrylamide acrylate emulsion copolymer adhesive.

Interpenetrating Polymer Networks (IPN)

Two IPN systems were prepared. An acrylamide-containing IPN was formed in a carboxylated acrylate emulsion polymer (4846-82 and 5121-48A, respectively), and a carboxylated IPN was formed in an acrylamide-containing acrylate emulsion polymer (4846-84 and 5121-48B, respectively). An increase in mean particle size during the IPN reactions, conversion, and performance similarities in alternate IPN first and second stage polymerization arrangements is evidence for actual IPN formation.

Both IPN emulsion adhesives listed in Table 4 displayed very similar adhesive performance, showing good initial peel and tack values, and low peel build upon applied heat aging. Adhesive 4121-48B, an acrylic acid IPN, displayed the best peel profile in these comparisons with 30 minutes dwell of 14 oz, 24 hour dwell of 18 oz, one week dwell values of 19 oz, and one week dwell at elevated temperature of 22 oz.

Comparison of adhesive properties obtained for the first stage emulsion polymers (5121-18A and 5121-18B) demonstrated how significantly the networking of alternate hydrophilic polymer functionality (i.e., carboxylic acid and amide) enhances the performance profile of these removable pressure sensitive adhesives.

I claim:

1. An aqueous pressure sensitive adhesive composition comprising in water:
    (I) a polymer system wherein said system is:
        (A)
            (a) a copolymer of between about 95 wt-% and 99.9 wt-% of a $C_4$–$C_{18}$ alkyl (meth)acrylate monomer and between about 0.1 wt-% and 5 wt-% N-alkyl substituted or unsubstituted amide of (meth)acrylic acid, and
            (b) a homopolymer or copolymer of between about 0 wt-% and 99.8 wt-% of a $C_4$–$C_{18}$ alkyl (meth)acrylate monomer and about 0.2 wt-% and 100 wt-% of an ethylenically unsaturated carboxylic acid; or
        (B)
            (a) a copolymer of between about 90 wt-% and 99.8 wt-% of a $C_4$–$C_{18}$ alkyl (meth)acrylate monomer and about 0.2 wt-% and 10 wt-% of an ethylenically unsaturated carboxylic acid; and
            (b) a homopolymer or copolymer of between about 0 wt-% and 99.1 wt-% of a $C_4$–$C_{18}$ alkyl (meth)acrylate monomer and between about 0.1 wt-% and 100 wt-% N-alkyl substituted or unsubstituted amide of (meth)acrylic acid, or
        (C) an interpenetrating polymer network emulsion of:
            (a) a copolymer of a $C_4$–$C_{18}$ alkyl (meth)acrylate monomer and about 0.2 wt-% and 10 wt-% of an ethylenically unsaturated carboxylic acid, and
            (b) a copolymer of a $C_4$–$C_{18}$ alkyl (meth)acrylate monomer and between about 0.1 wt-% and 5 wt-% N-alkyl substituted or unsubstituted amide of (meth)acrylic acid,
        wherein at least one of (A)(a) or (A)(b) is a copolymer made by emulsion polymerization and at least one of (B)(a) or (B)(b) is a copolymer made by emulsion polymerization; and
    (II) a surfactant.

2. The adhesive composition of claim 1 wherein said $C_4$–$C_{18}$ alkyl (meth)acrylate monomer of one or more of said copolymers (A)(a) (A)(b), (B)(a), (B)(b), (C)(a), or (C)(b) is a $C_4$–$C_{12}$ alkyl (meth)acrylate monomer.

3. The adhesive composition of claim 2 wherein said $C_4$–$C_{18}$ alkyl (meth)acrylate monomer of one or more of said copolymers (A)(a) (A)(b), (B)(a), (B)(b), (C)(a), or (C)(b) is selected from the group consisting of n-butyl acrylate, 2-ethylhexyl acrylate, and mixtures thereof.

4. The adhesive composition of claim 1 wherein said ethylenically unsaturated carboxylic acid of said copolymer (A)(b), (B)(a), or (C)(a) is selected from the group consisting of an acrylic or lower alkyl-substituted acrylic acid, crotonic acid, isocrotonic acid, vinyl acetic acid, fumaric acid, maleic acid, glutaconic acid, allyl malonic acid, allyl succinic acid, itaconic acid, and mixtures thereof.

5. The adhesive composition of claim 4 wherein said ethylenically unsaturated carboxylic acid is acrylic acid.

6. The adhesive composition of claim 1 wherein one or more of said copolymers (A)(a), (A)(b), (B)(a), (B)(b), (C)(a), or (C)(b) additionally contains up to about 25% by weight of one or more of a polymerizable aromatic monomer, a vinyl chloride monomer, or a vinylidene chloride monomer.

7. The adhesive composition of claim 6 wherein said aromatic monomer is styrene or a lower-alkyl substituted vinylbenzene.

8. The adhesive composition of claim 6 wherein one or more of said copolymers (A)(a) (A)(b), (B)(a), (B)(b), (C)(a), or (C)(b) contains about 5% by weight of styrene.

9. The adhesive composition of claim 1 which has been basified with a base.

10. The adhesive composition of claim 9 wherein said basification of said adhesive composition with a base is to a pH of between about 8 and 9.

11. The adhesive composition of claim 9 wherein said base is selected from the group consisting of aqueous ammonia, an amine, an imine, an alkali metal, an alkaline earth metal hydroxide, and an alkaline earth metal carbonate.

12. The adhesive composition of claim 1 wherein said surfactant (II) is a phosphate ester surfactant.

13. The adhesive composition of claim 12 wherein said phosphate-ester surfactant is selected from the group consisting of potassium alkyl aryl polyethoxy phosphate, potassium alkyl ethoxy phosphate, potassium alkyl phosphate, potassium alkyl polyethoxy phosphate, and mixtures thereof.

14. The adhesive composition of claim 1 which contains not more than about 15 wt-% of a cross-linking additive.

15. The adhesive composition of claim 1 wherein any emulsion copolymer (A)(a) (A)(b), (B)(a), or (B)(b), or said interpenetrating polymer network emulsion (C) is synthesized to a non-volatile solids content of between about 50% and 65%.

16. The adhesive composition of claim 1 wherein residual unreacted monomer is removed from said copolymers (A)(a) (A)(b), (B)(a), or (B)(b) prior to forming said adhesive composition.

17. The adhesive composition of claim 1 wherein said copolymer (A)(a) or (B)(a), or said interpenetrating polymer network emulsion (C) is synthesized under emulsion copolymer conditions at a pH of less than 4.

* * * * *